(12) United States Patent
Lu et al.

(10) Patent No.: US 11,345,553 B2
(45) Date of Patent: May 31, 2022

(54) NON-CONTACT TRANSPORTING APPARATUS

(71) Applicant: HAN'S LASER TECHNOLOGY INDUSTRY GROUP CO., LTD., Guangdong (CN)

(72) Inventors: Song Lu, Guangdong (CN); Jin Wang, Guangdong (CN); Feng Cao, Guangdong (CN); Chengquan Zhou, Guangdong (CN); Zhengfeng Liu, Guangdong (CN); Zekai Xie, Guangdong (CN); Jiaming You, Guangdong (CN); Bing Ding, Guangdong (CN); Yunfeng Gao, Guangdong (CN)

(73) Assignee: HAN'S LASER TECHNOLOGY INDUSTRY GROUP CO., LTD., Guangdong (CN)

( * ) Notice: Subject to any disclaimer, the term of this patent is extended or adjusted under 35 U.S.C. 154(b) by 824 days.

(21) Appl. No.: 16/307,791

(22) PCT Filed: Aug. 7, 2017

(86) PCT No.: PCT/CN2017/096255
§ 371 (c)(1),
(2) Date: Dec. 6, 2018

(87) PCT Pub. No.: WO2019/028601
PCT Pub. Date: Feb. 14, 2019

(65) Prior Publication Data
US 2021/0221627 A1 Jul. 22, 2021

(51) Int. Cl.
*B65G 35/00* (2006.01)
*B65G 54/02* (2006.01)
(Continued)

(52) U.S. Cl.
CPC ............... *B65G 54/02* (2013.01); *B06B 1/06* (2013.01); *B25J 15/06* (2013.01); *B65G 27/16* (2013.01);
(Continued)

(58) Field of Classification Search
CPC ...................................... B65G 35/00
See application file for complete search history.

(56) References Cited

U.S. PATENT DOCUMENTS 4,173,725 A * 11/1979 Asai .................. B06B 1/0618
310/325
4,176,454 A * 12/1979 Hatter ................... A61C 17/20
366/127
(Continued)

FOREIGN PATENT DOCUMENTS

CN 1462253 A 12/2003
CN 1642833 A 7/2005
(Continued)

OTHER PUBLICATIONS

Office Action dated Mar. 3, 2020 issued in corresponding Japanese Patent Application No. 2019-503418 (3 pages).
(Continued)

*Primary Examiner* — Olisa Anwah
(74) *Attorney, Agent, or Firm* — Polsinelli PC (57) ABSTRACT

A non-contact transporting apparatus (10) includes: a negative pressure assembly (100) configured to generate a negative pressure airflow within the non-contact transporting apparatus; and an ultrasonic assembly (200) connected to the negative pressure assembly (100). The ultrasonic assembly (200) includes: an ultrasonic transducer (210) configured to convert a high-frequency ultrasonic electrical signal into a high-frequency mechanical vibration, one end of the ultrasonic transducer (210) is connected to the negative pressure
(Continued)

assembly (100); an ultrasonic horn (230) configured to amplify the high-frequency mechanical vibration, one end of the ultrasonic horn (230) is connected to one end of the ultrasonic transducer (210) away from the negative pressure assembly (100); and an ultrasonic chuck (250) configured to amplify and convert the high-frequency mechanical vibration, the ultrasonic chuck (250) is connected to one end of the ultrasonic horn (230) away from the ultrasonic transducer (210).

19 Claims, 5 Drawing Sheets

(51) Int. Cl.
*B06B 1/06* (2006.01)
*B25J 15/06* (2006.01)
*B65G 27/16* (2006.01)
*H04R 17/00* (2006.01)

(52) U.S. Cl.
CPC ......... *H04R 17/00* (2013.01); *B65G 2812/99* (2013.01)

(56) References Cited

U.S. PATENT DOCUMENTS

| | | | | |
|---|---|---|---|---|
| 5,096,532 | A * | 3/1992 | Neuwirth | B06B 3/00 156/580.1 |
| 2009/0018490 | A1 * | 1/2009 | Wuchinich | A61B 17/320068 604/22 |
| 2011/0196404 | A1 * | 8/2011 | Dietz | A61B 17/3207 606/169 |
| 2013/0178789 | A1 * | 7/2013 | Mackool | A61B 90/37 604/22 |
| 2016/0287277 | A1 * | 10/2016 | Du | A61B 17/22012 |
| 2017/0304655 | A1 * | 10/2017 | Cotter | A61N 7/022 |
| 2018/0146975 | A1 * | 5/2018 | Zhang | A61B 17/320068 |
| 2018/0345318 | A1 * | 12/2018 | Miura | B06B 1/0207 |
| 2019/0153800 | A1 * | 5/2019 | Song | E21B 44/00 |
| 2019/0336161 | A1 * | 11/2019 | Scheller | A61B 17/320068 |
| 2021/0093341 | A1 * | 4/2021 | Baker | A61B 17/22012 |

FOREIGN PATENT DOCUMENTS

| | | |
|---|---|---|
| CN | 101743185 A | 6/2010 |
| CN | 102101296 A | 6/2011 |
| CN | 102490132 A | 6/2012 |
| CN | 102594221 A | 7/2012 |
| CN | 1027855940 A | 11/2012 |
| CN | 202935948 U | 5/2013 |
| CN | 104085691 A | 10/2014 |
| CN | 1055151780 A | 12/2015 |
| CN | 206255626 U | 6/2017 |
| JP | 6-48602 A | 2/1994 |
| JP | 2010052063 A | 3/2010 |
| JP | 2011062068 A | 3/2011 |

OTHER PUBLICATIONS

International Search Report dated May 2, 2018 in the parent application PCT/CN2017/096255. 10 pages.
Office Action dated Nov. 26, 2018 issued in corresponding Chinese Patent Application No. 201780001177.5 (10 pages).
Office Action dated Jul. 3, 2019 issued in corresponding Chinese Patent Application No. 201780001177.5 (9 pages).

* cited by examiner

NON-CONTACT TRANSPORTING APPARATUS

CROSS REFERENCE TO RELATED APPLICATION

This application is a National Phase filing under 35 U.S.C. § 371 of PCT/CN2017/096255 filed on Aug. 7, 2017, the entire content of which is hereby incorporated by reference.

FIELD OF THE INVENTION

The present disclosure relates to the technical field of transportation equipment, and more particularly relates to a non-contact transporting apparatus.

BACKGROUND OF THE INVENTION

The current commonly used non-contact transportation methods mainly includes maglev transport, airflow positive pressure transport, airflow negative pressure transport, ultrasonic standing wave suspension transport, and ultrasonic near sound field suspension transport.

The maglev transport requires the material to have magnetic effect, thus the scope of application is relatively narrow. The airflow negative pressure transport and the airflow positive pressure transport both require large flow of airflow, the constitution of the apparatus is complex, the space requirement is large, and the impact of the airflow is generally relatively large, the airflow requires to be very clean and the pressure of the airflow requires to be strictly controlled, otherwise the airflow will damage and contaminate the surface of the material. The ultrasonic standing wave suspension transport requires the main size of the material to be much smaller than half-wavelength, thus it can only transport small size materials. The levitation force of the ultrasonic near sound suspension is relatively large, and the amplitude transfer performance is better, the material size is not strictly required.

In the current industry, the mainly used non-contact transporting apparatus is two: 1. an airflow direct suction using positive pressure or negative pressure as the gas source; 2. an absorption type producing vortex flow field. Both apparatus require precise control, and the vortex flow field type also require complex machining, however, both apparatus are difficult to ensure that the material does not collide to the surface of the apparatus during use. When the material is sucked, it is necessary to have a relatively large suction due to the adhesion between the lower surface of the material and other objects, such that the material will gradually accelerate to close to the suction apparatus. However, when the material is sucked up to a certain distance from the surface of the apparatus, it is necessary to reduce the gas suction, such that the material can gradually decrease the rate of suction, so as to avoid collision with the surface of apparatus. However, in general, it is only when the apparatus is about 5 mm from the material, the gas suction can suck the material, thus the entire stroke distance is very short. Meanwhile, since the air pressure change in the working process is not obvious due to gas compressibility, the air pressure is difficult to be precisely sensed and timely adjustment, thus the entire control process will be very difficult so as to achieve non-contact effect.

SUMMARY OF THE INVENTION

Accordingly, in view of the problem that the current non-contact conveying apparatus is prone to touch the surface of the material when sucking the material, it is necessary to provide a non-contact transporting apparatus.

A non-contact transporting apparatus includes:

a negative pressure assembly configured to generate a negative pressure airflow within the non-contact transporting apparatus; and an ultrasonic assembly connected to the negative pressure assembly, the ultrasonic assembly includes:

an ultrasonic transducer configured to convert a high-frequency ultrasonic electrical signal into a high-frequency mechanical vibration, one end of the ultrasonic transducer is connected to the negative pressure assembly;

an ultrasonic horn configured to amplify the high-frequency mechanical vibration, one end of the ultrasonic horn is connected to one end of the ultrasonic transducer away from the negative pressure assembly; and an ultrasonic chuck configured to amplify and convert the high-frequency mechanical vibration, the ultrasonic chuck is connected to one end of the ultrasonic horn away from the ultrasonic transducer.

In the aforementioned non-contact transporting apparatus, the negative pressure assembly generates a vertical upward suction on the material by generating a negative pressure airflow, the negative pressure airflow is controlled by the negative pressure assembly to upwardly suck the material and reduce the falling speed of the material during the falling of the material. Meanwhile, the ultrasonic transducer in the ultrasonic assembly produces high-frequency mechanical vibration, and the ultrasonic horn and the ultrasonic chuck amplify and convert the high-frequency mechanical vibration to form a stable and continuous near sound field levitation force. In the process of the upwardly sucking the material and material falling, a downward levitation force is generated to prevent the material from contacting the non-contact transporting device. The aforementioned non-contact transporting device achieves the multi-level cushioning of the rising and falling processes of the material by the cooperating effect of the negative pressure assembly and the ultrasonic assembly, thereby stably avoiding the contact and collision of the material with the non-contact transporting device.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The non-contact transporting apparatus are described in further detail hereinafter with reference to the specific embodiments and the accompanying drawings.

Figure 1:
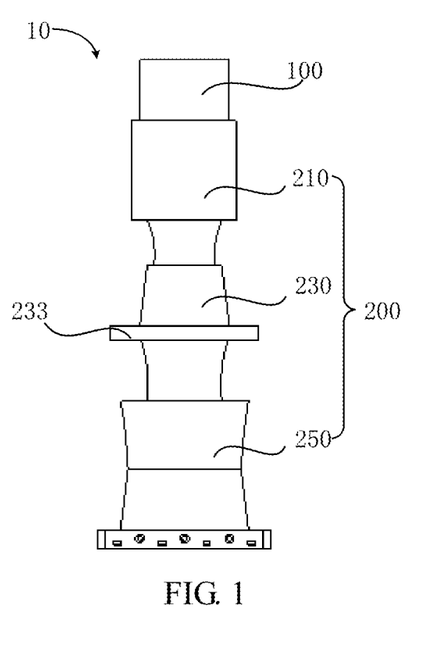
FIG. 1 is a schematic view of a non-contact transporting apparatus according to an embodiment.
Figure 2:
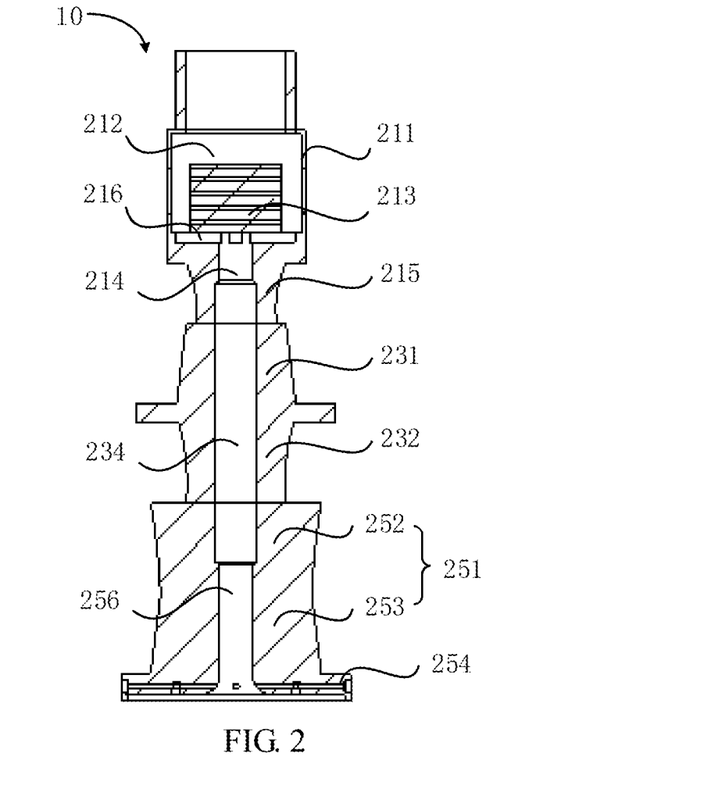
FIG. 2 is a cross-sectional view of the non-contact transporting apparatus of FIG. 1.

Referring to FIG. 1 and FIG. 2, a non-contact transporting apparatus 10 according to an embodiment includes a negative pressure assembly 100 and an ultrasonic assembly 200 connected to the negative pressure assembly 100.

In the illustrated embodiment, the negative pressure assembly 100 is a fan, which can generate a negative pressure airflow, thereby producing a certain suction to the material. Of course, in alternative embodiments, the negative pressure assembly 100 may also be a vacuum generator.

In the illustrated embodiment, the ultrasonic assembly 200 includes an ultrasonic transducer 210, an ultrasonic horn 230, and an ultrasonic chuck 250.

In one embodiment, the ultrasonic transducer 210, the ultrasonic horn 230, and the ultrasonic chuck 250 are both hollow structures. The ultrasonic transducer 210, the ultrasonic horn 230, and the ultrasonic chuck 250 are in communication with each other. By using the hollow structures as an airflow passage, on the one hand, the utilization efficiency of the ultrasonic assembly will not be reduced, on the other hand, a cold airflow can be used to form an internal negative pressure, and the cold airflow may play the role of cooling and heat dissipation when the cold airflow passes through the ultrasonic assembly, thereby improving the stability of the ultrasonic assembly and extending the service life.

The ultrasonic transducer 210 is configured to convert a high-frequency ultrasonic electrical signal into a high-frequency mechanical vibration. In one embodiment, the ultrasonic transducer 210 includes a transducer body 211, a piezoelectric ceramic stack 213, and a transducer connecting portion 215. In the illustrated embodiment, the transducer body 211 is a box structure, and the transducer body 211 defines an accommodating cavity 212. The negative pressure assembly 100 is connected to one end of the transducer body 211 and is in communication with the accommodating cavity 212, such that the negative pressure assembly 100 may draw the gas in the accommodating cavity 212 out, thereby forming a negative pressure in an interior of the non-contact transporting device 10.

In the illustrated embodiment, the piezoelectric ceramic stack 213 is accommodated in the accommodating cavity 212. The ultrasonic transducer 210 is capable of receiving a continuous high-frequency electrical signal transmitted by an ultrasonic generator (not shown). According to the inverse piezoelectric effect, the piezoelectric ceramic stack 213 is capable of converting the continuous high-frequency electric signal into a high-frequency deformation, which exhibits as a high-frequency mechanical vibration.

One end of the transducer connecting portion 215 is connected to one end of the transducer body 211 away from the negative pressure assembly 100. In the illustrated embodiment, the transducer connecting portion 215 defines a first through hole 214 extending through the transducer connecting portion 215. An air groove 216 is defined at a connection between the transducer body 211 and the transducer connecting portion 215. The first through hole 214 may be in communication with the accommodating cavity 212 through the air groove 216, and the air groove 216 may not affect the preload and vibration transmission of the ultrasonic transducer 210. In one embodiment, the transducer body 211 and the transducer connecting portion 215 are integrally formed.

In the illustrated embodiment, a cross-sectional area of the transducer connecting portion 215 gradually decreases in a direction from one end thereof adjacent to the transducer body 211 towards the other end thereof away from the transducer body 211. As the cross-sectional area of the transducer connecting portion 215 gradually decreases, the energy is concentrated, thereby increasing the amplitude of the mechanical vibration.

The ultrasonic horn 230 is configured to amplify the high-frequency mechanical vibration. One end of the ultrasonic horn 230 is connected to one end of the ultrasonic transducer 210 away from the negative pressure assembly 100. The ultrasonic horn 230 defines a second through hole 234 extending through the ultrasonic horn 230, and the second through hole 234 is in communication with the first through hole 214.

In the illustrated embodiment, the ultrasonic horn 230 includes a first horn 231 and a second horn 232 connected with each other. One end of the first horn 231 is connected to one end of the ultrasonic transducer 210 away from the negative pressure assembly 100, the other end of the first horn 231 is connected to one end of the second horn 232. In the illustrated embodiment, a cross-sectional area of the first horn 231 gradually increases in a direction from one end thereof adjacent to the ultrasonic transducer 210 towards the other end thereof away from the ultrasonic transducer 210. In one embodiment, an increasing rate of the cross-sectional area of the first horn 231 from one end thereof adjacent to the ultrasonic transducer 210 towards the other end thereof away from the ultrasonic transducer 210 is constant. In the illustrated embodiment, a cross-sectional area of the second horn 232 gradually decreases in a direction from one end thereof adjacent to the first horn 231 towards the other end thereof away from the first horn 231. In one embodiment, a decreasing rate of the cross-sectional area of the second horn 232 from one end thereof adjacent to the first horn 231 towards the other end thereof away from the first horn 231 becomes smaller. The ultrasonic horn 230 of the aforementioned structure can realize the amplification of the mechanical vibration amplitude.

The cross-sectional area of a connection between the first horn 231 and the second horn 232 is maximum and the amplitude of the mechanical vibration is minimum. In the illustrated embodiment, a flange 233 is disposed at the connection between the first horn 231 and the second horn 232. The flange 233 is configured to fix the non-contact transporting apparatus 10. The use of flange for the fixation instead of defining an opening on the ultrasonic assembly can prevent the ultrasonic frequency being changed caused by the opening.

The ultrasonic chuck 250 includes a chuck connecting portion 251 and a chuck body 254. One end of the chuck connecting portion 251 is connected to one end of the ultrasonic horn 230 away from the ultrasonic transducer 210, the other end of the chuck connecting portion 251 is connected to the chuck body 254. In the illustrated embodiment, the chuck connecting portion 251 defines a third through hole 256 extending through the chuck connecting portion 251, and the third through hole 256 is in communication with the second through hole 234.

In one embodiment, the chuck connecting portion 251 includes a first chuck connecting portion 252 and a second chuck connecting portion 253. One end of the first chuck connecting portion 252 is connected to one end of the ultrasonic horn 230 away from the ultrasonic transducer 210, the other end of the first chuck connecting portion 252 is connected to one end of the second chuck connecting portion 253. In the illustrated embodiment, a cross-sectional area of the first chuck connecting portion 252 gradually decreases in a direction from one end thereof adjacent to the ultrasonic horn 230 towards the other end thereof away from the ultrasonic horn 230. The gradual decrease of the cross-sectional area of the first chuck connecting portion 252 may realize the amplification of the mechanical vibration amplitude. A cross-sectional area of the second chuck connecting portion 253 gradually increases in a direction from one end thereof adjacent to the first chuck connecting portion 252 towards the other end thereof away from the first chuck connecting portion 252. The gradual increase of the cross-sectional area of the second chuck connecting portion 253 may increase the transmission area of the mechanical vibration.

Figure 3:
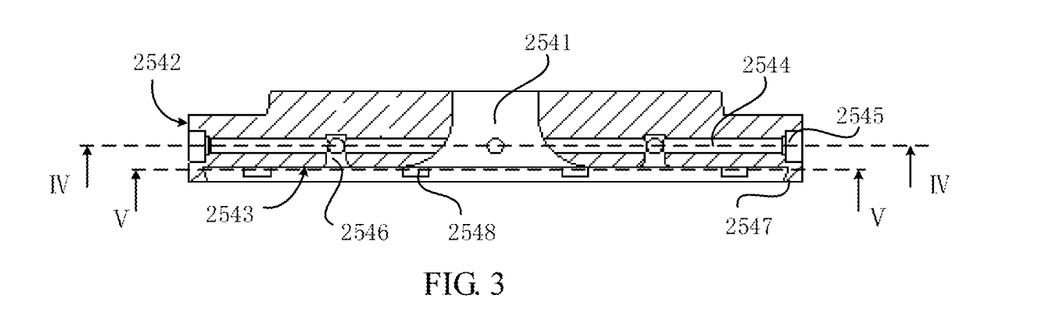
FIG. 3 is a schematic view of the chuck body of the non-contact transporting apparatus of FIG. 1.
Figure 4:
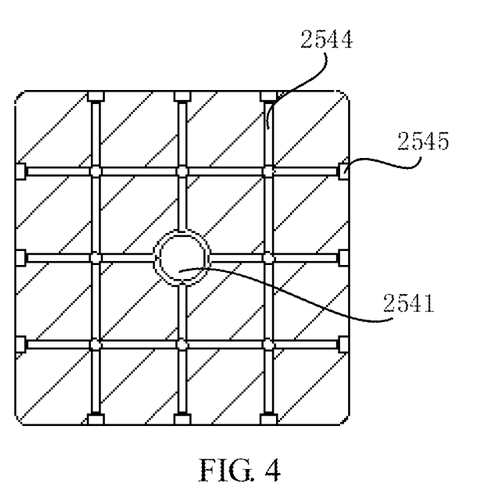
FIG. 4 is a cross-sectional view of the chuck body of the non-contact transporting apparatus taken along line IV-IV of FIG. 3.
Figure 5:
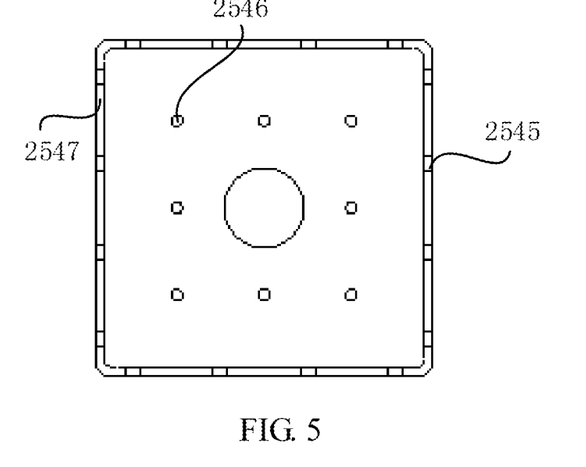
FIG. 5 is a cross-sectional view of the chuck body of the non-contact transporting apparatus taken along line V-V of FIG. 3.

Referring to FIG. 3 to FIG. 5, the chuck body 254 is connected to one end of the chuck connecting portion 251 away from the ultrasonic horn 230. Specifically, the chuck body 254 is connected to one end of the second chuck connecting portion 253 away from the first chuck connecting portion 252. The chuck body 254 defines a central air hole 2541 extending through the chuck body 254. The central air hole 2541 is in communication the third through hole 256.

In one embodiment, the chuck body 254 has an adsorption surface 2543 and a non-adsorption surface 2542. Subject to the ultrasonic assembly 200, the adsorption surface 2543 of the chuck body 254 produces a certain form of vibration, thereby producing a near sound field levitation force to the material.

The central air hole 2541 extends through the adsorption surface 2543. In the illustrated embodiment, the chuck body 254 is a cubic plate structure. The chuck body 254 has two opposite surfaces and four side surfaces. One surface of the chuck body 254 is connected to the second chuck connecting portion 253. In the illustrated embodiment, the surface of the chuck body 254 away from the second chuck connecting portion 253 is the adsorption surface, and the surface of the chuck body 254 adjacent to the second chuck connecting portion 253 and the four side surfaces are the non-adsorption surface. In the illustrated embodiment, the central air hole 2541 extends through the surface of the chuck body 254 opposite to the adsorption surface 2543.

In one embodiment, the chuck body 254 defines a first passage 2544 therein. The first passage 2544 is in communication with the central air hole 2541. It should be understood that, the first passage 2544 may be in communication with the central air hole 2541 either directly or indirectly. In the illustrated embodiment, the chuck body 254 defines three first passages 2544 extending along a first direction therein, and defines three first passages 2544 extending along a direction perpendicular to the first direction therein, such that the first passages 2544 are staggered with each other. Of course, in alternative embodiments, the number of the first passages 2544 may be any other number, and the arrangement of the first passages 2544 may also be in other forms. In the illustrated embodiment, the first passages 2544 are led out from the four side surfaces of the chuck body 254, respectively. Of course, in alternative embodiments, the first passage 2544 may also be led out from the surface of the chuck body 254 adjacent to the second chuck connecting portion 253.

In the illustrated embodiment, a cushion member (not shown) is provided at a junction between the first passage 2544 and the non-adsorption surface 2542. The cushion member is made of porous materials that do not affect the frequency of the ultrasonic assembly. These porous materials have a large flow resistance coefficient, which can be configured to maintain the relative stability of the internal air pressure and ease the impact when materials suddenly rises and falls. In the illustrated embodiment, the non-adsorption surface 2542 defines a first damping hole 2545 at the junction between the first passage 2544 and the non-adsorption surface 2542. The first damping hole 2545 is configured to receive the cushion member.

In the illustrated embodiment, the chuck body 254 further defines a second passage 2546. One end of the second passage 2546 is in communication with the first passage 2544, and the other end of the second passage 2546 is led out from the adsorption surface 2543. In one embodiment, one end of the second passage 2546 is in communication with the first passage 2544 at an intersection thereof.

In the illustrated embodiment, the chuck body 254 is further provided with a blocking portion convexly protruding from the adsorption surface 2543. The blocking portion 2547 is an annular projection. The adsorption surface 2543 and the blocking portion 2547 cooperatively form a receiving cavity (not shown), and the receiving cavity is capable of receiving the material. In one embodiment, a width of the receiving cavity gradually decreases from the adsorption surface 2543 in a direction away from the adsorption surface 2543.

In the non-contact transporting apparatus 10 having the aforementioned structures, the ultrasonic assembly 200 generates a gas film having a relatively large air pressure gradient on the adsorption surface 2543. When the material is stably sucked, the airflow flows uniformly from the periphery to an air defined between the adsorbing surface 2543 and the material, such that a tangential force from the periphery to the material center which will not damage the surface of the material is formed to the surface of the material, thus the material is stabilized at the tangential position. Meanwhile, the material is covered in the receiving cavity cooperatively formed by the adsorption surface 2543 and the blocking portion 2547, and the material is tightly adsorbed into the air film formed by the ultrasonic assembly 200. Therefore, the non-contact transporting apparatus can be reversed during the transporting, and the material will not fall.

In the illustrated embodiment, the blocking portion 2547 defines a second damping hole 2548 extending through the blocking portion 2547. In one embodiment, the cushion member is accommodated in the second damping hole 2548. The cushion member is made of porous materials that do not affect the frequency of the ultrasonic assembly. These porous materials have a large flow resistance coefficient, which can be configured to maintain the relative stability of the internal air pressure and ease the impact when materials suddenly rises and falls.

In the aforementioned non-contact transporting apparatus, the negative pressure assembly generates a vertical upward suction on the material by generating a negative pressure airflow, the negative pressure airflow is controlled by the negative pressure assembly to upwardly suck the material and reduce the falling speed of the material during the falling of the material. Meanwhile, the ultrasonic transducer in the ultrasonic assembly produces high-frequency mechanical vibration, and the ultrasonic horn and the ultrasonic chuck amplify and convert the high-frequency mechanical vibration to form a stable and continuous near sound field levitation force. In the process of the upwardly sucking the material and material falling, a downward levitation force is generated to prevent the material from contacting the non-contact transporting device. The aforementioned non-contact transporting device achieves the multi-level cushioning of the rising and falling processes of the material by the cooperating effect of the negative pressure assembly and the ultrasonic assembly, thereby stably avoiding the contact and collision of the material with the non-contact transporting device.

Meanwhile, the structure of the aforementioned non-contact transporting device is simple without additional accessories, the non-essential portion of the ultrasonic assembly can be directly debugged and modified after stomata and other dimensions are modified, and the frequency correction is simple.

The operational process of the aforementioned non-contact transporting apparatus is further described below by the rising and falling processes of the material.

In an operating stroke, the aforementioned non-contact transporting apparatus 10 first sucks the material, and after the height of the material is stabilized, the non-contact transporting apparatus 10 is transported to the designated position, and then the material is lowered. During the whole operating stroke, the ultrasonic assembly 200 is always in the operating state, which emits stable and continuous ultrasonic waves, and forms a near sound field levitation force on the adsorption surface 2543, thereby preventing the material from contacting the surface of the non-contact transporting apparatus. The ultrasonic assembly stops working until the material falls to a certain height.

The whole operating stroke is divided into stage A, stage B, stage C, and stage D according to the order that rising first and falling later of the material.

In the stage A, the ultrasonic assembly 200 starts to work, and forms the near sound field levitation force on the adsorption surface 2543 of the ultrasonic chuck 250. At the same time, the negative pressure assembly 100 starts to work, the wind power gradually increases, and the airflow starts to flow in from a clearance between the material and the blocking portion 2547, and flows to the negative pressure assembly 100 mainly through the central air hole 2541, and finally is exhausted. When the air pressure of the central air hole 2541 reaches a certain commissioning pressure, a portion of the airflow begins to be sucked from the second passage 2546, and converges to the central air hole 2541 through the first passage 2544. The material overcomes the adhesion of the lower surface, and then the material is accelerated to rise to a height adjacent to the stable position. At this stage, the clearance between the material and the blocking portion 2547 is small, which is 0.5 mm to 1 mm, such that the air volume is sufficiently utilized, and the upward wind force is large enough to suck the material.

In the stage B, the material is close to the stable position, and the air volume gradually decreases, thereby reducing the rising acceleration of the material. The magnitude of the near sound field levitation force and the square of the distance between the material and the adsorption surface have a certain inverse proportional relationship, which is expresses as: $F=k*x^{-2}$, wherein F is the near sound field levitation force, x is the distance between the material and the adsorption surface, k is a constant. Therefore, when the material approaches the adsorption surface 2543, the downward near sound field levitation force acting on the material becomes larger, such that the distance between the material and the adsorption surface 2543 is increased. The air volume of the negative assembly 100 is decreased, the increase of the airflow passage between the material and the adsorption surface 2543 leads to the decrease of the suction, while the near sound field levitation force is increased, such that the acceleration of the material is reduced to zero, thereby stabilizing the material so as to reach the stable position that does not contact with the surface of the apparatus. In this process, the excess air pressure will be discharged through the first damping hole 2545 and the second damping hole 2548, since the first damping hole 2545 and the second damping hole 2548 are filled with porous materials. The porous materials have a large flow resistance coefficient, such that the internal air pressure of the apparatus is kept relatively stable.

In the stage C, the material begins to fall, the air volume continues to decrease, and the air volume through the first damping hole 2545 and the second damping hole 2548 gradually decreases to zero. The ultrasonic assembly 200 is still in operation, the material is subjected to a downward force such that it is accelerated to fall until the distance from the adsorption surface 2543 is 1.2 mm to 1.8 mm. The near sound field levitation force becomes very small, and the operation of the ultrasonic assembly 200 can be suspended to sufficient heat dissipation.

In the stage D, the material is accelerated to fall, the air volume continues to decrease, and the airflow volume through the second passage 2546 gradually decreases to zero. The airflow is mainly passed through the central air hole 2541. At this stage, the material moves downwardly by the downward force. However, since the width of the receiving cavity cooperatively formed by the adsorption surface 2543 and the blocking portion 2547 gradually decreases from the adsorption surface 2543 in a direction away from the adsorption surface 2543, the clearance between the material and the blocking portion is reduced during the falling of the material, such that the effective wind force is relatively increased, the falling acceleration of the material decreases, thus the material slowly falls until landing. In alternative embodiments, the falling acceleration of the material can be reduced by adjusting the air volume of the negative pressure assembly 100, thereby avoiding the damage and impact to the material.

Although the respective embodiments have been described one by one, it shall be appreciated that the respective embodiments will not be isolated. Those skilled in the art can apparently appreciate upon reading the disclosure of this application that the respective technical features involved in the respective embodiments can be combined arbitrarily between the respective embodiments as long as they have no collision with each other. Of course, the respective technical features mentioned in the same embodiment can also be combined arbitrarily as long as they have no collision with each other.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:
1. A non-contact transporting apparatus, comprising:
a negative pressure assembly configured to generate a negative pressure airflow within the non-contact transporting apparatus; and
an ultrasonic assembly connected to the negative pressure assembly, the ultrasonic assembly comprising:
an ultrasonic transducer configured to convert a high-frequency ultrasonic electrical signal into a high- frequency mechanical vibration, one end of the ultrasonic transducer being connected to the negative pressure assembly;
an ultrasonic horn configured to amplify the high-frequency mechanical vibration, one end of the ultrasonic horn being connected to one end of the ultrasonic transducer away from the negative pressure assembly; and
an ultrasonic chuck configured to amplify and convert the high-frequency mechanical vibration, the ultrasonic chuck being connected to one end of the ultrasonic horn away from the ultrasonic transducer;
wherein the ultrasonic transducer comprises a transducer body, a piezoelectric ceramic stack, and a transducer connecting portion; the ultrasonic transducer body defines an accommodating cavity, the piezoelectric ceramic stack is accommodated in the accommodating cavity; one end of the transducer connecting portion is connected to one end of the transducer body away from the negative pressure assembly.

2. The non-contact transporting apparatus according to claim 1, wherein the ultrasonic transducer, the ultrasonic horn, and the ultrasonic chuck are hollow structures, and the ultrasonic transducer, the ultrasonic horn, and the ultrasonic chuck are communicated with each other.

3. The non-contact transporting apparatus according to claim 1, wherein a cross-sectional area of the transducer connecting portion gradually decreases from one end thereof adjacent to the transducer body towards the other end thereof away from the transducer body.

4. The non-contact transporting apparatus according to claim 1, wherein the transducer connecting portion defines a first through hole therethrough, an air groove is defined between the transducer connecting portion and the transducer body, the first through hole is in communication with the accommodating cavity through the air groove.

5. The non-contact transporting apparatus according to claim 4, wherein the ultrasonic horn defines a second through hole therethrough, the second through hole is in communication with the first through hole of the transducer connecting portion.

6. The non-contact transporting apparatus according to claim 5, wherein the ultrasonic chuck comprises a chuck body and a chuck connecting portion, one end of the chuck connecting portion is connected to one end of the ultrasonic horn away from the ultrasonic transducer, the other end of the chuck connecting portion is connected to the chuck body.

7. The non-contact transporting apparatus according to claim 6, wherein the chuck connecting portion defines a third through hole therethrough, the third through hole is in communication with the second through hole of the ultrasonic horn.

8. The non-contact transporting apparatus according to claim 7, wherein the chuck body defines a central air hole therethrough, the central air hole is in communication with the third through hole.

9. The non-contact transporting apparatus according to claim 8, wherein the chuck body has an adsorption surface and a non-adsorption surface; the central air hole is led out from the adsorption surface; the chuck body defines a first passage therein, the first passage is in communication with the central air hole and is led out from the non-adsorption surface.

10. The non-contact transporting apparatus according to claim 9, wherein the first passage and the non-adsorption surface are provided with a cushion member at a junction therebetween; the non-adsorption surface defines a first damping hole at the junction between the first passage and the non-adsorption surface, the first damping hole is configured to receive the cushion member.

11. The non-contact transporting apparatus according to claim 9, wherein the chuck body further defines a second passage in communication with the first passage, one end of the second passage is led out from the adsorption surface.

12. The non-contact transporting apparatus according to claim 9, wherein the chuck body is further provided with a blocking portion convexly protruding from the adsorption surface, the adsorption surface and the blocking portion cooperatively form a receiving cavity, the receiving cavity is capable of receiving a material.

13. The non-contact transporting apparatus according to claim 12, wherein a width of the receiving cavity gradually decreases from the adsorption surface in a direction away from the adsorption surface.

14. The non-contact transporting apparatus according to claim 12, wherein the blocking portion defines a second damping hole therethrough, the second damping hole is configured to receive the cushion member.

15. The non-contact transporting apparatus according to claim 6, wherein the chuck connecting portion comprises a first chuck connecting portion and a second chuck connecting portion connected with each other; one end of the first chuck connecting portion is connected to one end of the ultrasonic horn away from the ultrasonic transducer, the other end of the first chuck connecting portion is connected to one end of the second chuck connecting portion, the other end of the second chuck connecting portion is connected to the chuck body.

16. The non-contact transporting apparatus according to claim 15, wherein a cross-sectional area of the first chuck connecting portion gradually decreases from one end thereof adjacent to the ultrasonic horn towards the other end thereof away from the ultrasonic horn;
and/or a cross-sectional area of the second chuck connecting portion gradually increases from one end thereof adjacent to the first chuck connecting portion towards the other end thereof away from the first chuck connecting portion.

17. A non-contact transporting apparatus, comprising:
a negative pressure assembly configured to generate a negative pressure airflow within the non-contact transporting apparatus; and
an ultrasonic assembly connected to the negative pressure assembly, the ultrasonic assembly comprising:
an ultrasonic transducer configured to convert a high-frequency ultrasonic electrical signal into a high-frequency mechanical vibration, one end of the ultrasonic transducer being connected to the negative pressure assembly;
an ultrasonic horn configured to amplify the high-frequency mechanical vibration, one end of the ultrasonic horn being connected to one end of the ultrasonic transducer away from the negative pressure assembly; and
an ultrasonic chuck configured to amplify and convert the high-frequency mechanical vibration, the ultrasonic chuck being connected to one end of the ultrasonic horn away from the ultrasonic transducer;
wherein the ultrasonic horn comprises a first horn and a second horn connected with each other; one end of the first horn is connected to one end of the ultrasonic transducer away from the negative pressure assembly, the other end of the first horn is connected to one end of the second horn, the other end of the second horn is connected to the ultrasonic chuck.

18. The non-contact transporting apparatus according to claim 17, wherein a cross-sectional area of the first horn gradually increases from one end thereof adjacent to the ultrasonic transducer towards the other end thereof away from the ultrasonic transducer; and/or a cross-sectional area of the second horn gradually decreases from one end thereof adjacent to the first horn towards the other end thereof away from the first horn.

19. The non-contact transporting apparatus according to claim 18, wherein a flange is provided at a connection between the first horn and the second horn, the flange is configured to fix the non-contact transporting apparatus.

* * * * *